United States Patent [19]
Luppino

[11] 3,849,100
[45] Nov. 19, 1974

[54] TEMPERING GLASS SHEETS
[75] Inventor: Antonio Luppino, Willard, Ohio
[73] Assignee: PPG Industries, Inc., Pittsburgh, Pa.
[22] Filed: Oct. 24, 1972
[21] Appl. No.: 299,970

[52] U.S. Cl.......................... 65/348, 65/114, 65/351
[51] Int. Cl............................................. C03b 27/00
[58] Field of Search............. 65/104, 114, 348, 349, 65/350, 351, 106

[56] References Cited
UNITED STATES PATENTS
2,137,061  11/1938  Quentin ............................... 65/114
2,724,215  11/1955  Gilstrap ............................... 65/348
2,876,592  3/1959   Black et al........................... 65/351
3,353,946  11/1967  McMaster............................ 65/348
3,595,636  7/1971   Posney................................. 65/348

Primary Examiner—S. Leon Bashore
Assistant Examiner—Peter F. Kratz
Attorney, Agent, or Firm—Edward I. Mates; Thomas F. Shanahan

[57] ABSTRACT

Apparatus for tempering glass sheets comprising means for moving a pair of spaced, opposing plenum chambers in unison in either of two mutually perpendicular directions such as vertically or horizontally reciprocating paths or in closed orbital motion while imparting tempering fluid against the opposite surfaces of a glass sheet supported in the space between the opposing plenum chambers through nozzles extending from the plenum chamber.

3 Claims, 3 Drawing Figures

TEMPERING GLASS SHEETS

BACKGROUND OF THE INVENTION

This invention relates to apparatus for tempering flat or curved glass sheets and, more specifically, apparatus that imparts a more uniform temper to glass sheets of various configurations. sheet is heated above its annealing range and its surfaces are chilled rapidly to below the strain point while the interior is still hot. Rapid chilling continues until the entire glass sheet cools to below its strain point. This rapid cooling causes the glass sheet to develop a thin skin of compression stress surrounding an interior stressed in tension. Such a stress distribution makes the glass sheet much stronger than untempered glass so that tempered glass is less likely to shatter than untempered glass when struck by an object. Furthermore, in the less frequent times when an outside force is sufficiently large to cause tempered glass to fracture, tempered glass breaks up into a large number of smoothly surfaced, relatively small particles which are far less dangerous than the larger pieces with jagged edges that result from the fracture of untempered glass.

Typical prior art tempering apparatus include nozzles extending from plenum chambers to direct a plurality of air blasts against the opposite sides of a glass sheet. The prior art provides means to impart movement to the nozzles in unison relative to the glass surface so that the air blasts are not directed against fixed locations on the glass to cool the latter rapidly while other locations adjacent the fixed locations are not cooled as rapidly. Without such relative movement, patterns of iridescence form on the surface of the tempered glass. These patterns of iridescence are very annoying when viewed in reflection.

The glass tempering art has developed many techniques for imparting relative motion between the array of nozzles and the glass to avoid iridescent patterns. Some of these involve linear reciprocation of the nozzles. Others involve linear movement of glass sheets past an array of fixed nozzles. Others involve applying orbital movement (elliptical or circular) of nozzles relative to a glass sheet supported at a fixed position.

The shape of the glass sheet to be tempered and its manner of support between plenum chambers determines the best technique for providing relative movement between the nozzle arrays extending from the plenum chambers and the glass sheet to be tempered. For example, when vertically supported glass sheets are oriented with a sharp bend extending in a given direction, it is best to reciprocate the nozzle arrays along an axis parallel or approximately parallel to the given direction. When a flat glass sheet or a gently curved sheet of shallow curvature is tempered, it is usually most convenient to quench glass with nozzles to which are imparted circular orbital movements that overlap corresponding movement of adjacent nozzles. When glass sheets are supported so that an axis of sharp bending extends vertically, the nozzle arrays should be reciprocated in a vertical direction and when glass sheets to be tempered are supported in such a manner that an axis of sharp bending extends horizontally, the plenum chambers and the nozzle arrays are preferably reciprocated along a horizontal axis.

DESCRIPTION OF THE PRIOR ART

U.S. Pat. No. 2,724,215 to Gilstrap shows apparatus for reciprocating in unison a pair of plenum chambers in a vertical direction. This patent also suggests the possibility of reciprocating the plenum chambers in a horizontal direction.

U.S. Pat. No. 2,876,592 to Black and Moorhead and U.S. Pat. No. 2,876,593 to Neuhausen suggest imparting circular orbital motions to two sets of spaced opposing nozzles by simultaneously applying two mutually perpendicular reciprocations 90° out of phase with one another.

U.S. Pat. No. 3,294,519 to Fickes imparts a horizontal linear reciprocation to two sets of spaced curved nozzles disposed on opposite sides of a curved glass sheet to be tempered.

U.S. Pat. No. 3,595,636 to Posney discloses means to simultaneously reciprocate a pair of plenum chambers along a vertical axis of reciprocation relative to the opposite surfaces of a glass sheet suspended by tongs between the plenum chambers.

The apparatus of the prior art has been characterized by being capable of either linear reciprocation along a single axis of reciprocation or of providing circular orbital movement to all of the plenum chambers simultaneously. To the best of my knowledge, no glass tempering apparatus prior to the present invention has been provided with the capability of either horizontal or vertical reciprocation of all of the nozzles in unison and in addition the ability to impart circular orbital motion to all of the nozzles in unison.

SUMMARY OF THE PRESENT INVENTION

The present invention provides apparatus for cooling glass sheets comprising a pair of plenum chambers, each having an inward facing apertured wall facing a similar inward facing apertured wall of the other plenum chamber in spaced relation thereto, means for supporting a glass sheet between said apertured walls and means for imparting tempering medium under pressure to said plenum chambers for delivery through said apertured walls against the opposite surfaces of a heated glass sheet located between said apertured walls with novel motion imparting mechanism. The motion imparting mechanism comprises driving means, means for imparting reciprocating motion to said plenum chambers in unison along a first axis, means for imparting reciprocating motion to said plenum chambers in unison along a second axis angularly disposed relative to said first axis, and means to selectively couple said driving means to either or both of the said motion imparting means to selectively move said plenum chambers in unison either in a reciprocating motion along said first or second axis or a closed orbital path in the plane defined by said first and second axes. It is understood that it is within the purview of the present invention to provide two independently adjustable reciprocating means that are angularly disposed with respect to one another, which are preferably normal to one another but not necessarily so.

In a specific embodiment of the present invention, a main drive rod is provided with a first eccentric driving means having a removable drive pin connected to a lower support means that is driven in a horizontal path of reciprocation, and an upper support means is driven through a second eccentric driving means through a removable drive pin to an upper support means aligned with said lower support means and selectively capable of vertical reciprocation relative to the lower support means. The plenum chambers containing outlet nozzles are supported on the upper vertically reciprocatable support means.

A single main drive is provided to coordinate the movements of the various structural elements when movement is imparted to the various selected support means. Thus, when only the lower support means is coupled to the main drive through eccentric driving means and the upper support means is disconnected from the main drive shaft, the upper support means and the plenum chambers reciprocate in a horizontal direction with the lower support means. When only the upper support means is connected to the main drive shaft through its eccentric driving means, the plenum chambers are reciprocated vertically with the motion imparted to the upper support means. When the eccentric driving means for both the upper and lower support means are connected to the main drive shaft, a resulting circular closed orbital pattern is imparted to the plenum chambers and their associated nozzles. Thus, the eccentric driving means connecting the main drive to the lower support means serves as means for imparting reciprocating motion to said plenum chambers in a first direction and the eccentric driving means connecting the drive rod to the upper support means serves as means for imparting reciprocating motion to said plenum chambers in a second direction, preferably one that is approximately normal to said first direction. In a preferred embodiment, the first direction is horizontal and the second direction is vertical.

When air is applied under pressure to the plenum chambers for discharge through the arrays of nozzles against the opposite surfaces of a glass sheet supported between said nozzle arrays, the relative movement imparted to the nozzles causes the air blasts to be directed through the nozzles toward the opposite glass sheet surfaces over relatively moving areas of the glass that overlap one another so as to cause the glass to be cooled more uniformly. At the same time, the spaces between adjacent nozzles provides room for removing air blasts that are warmed by the glass cooling step.

The present invention will be understood more clearly in the light of a description of a specific embodiment that follows. While the embodiment described relates to apparatus for applying moving blasts of chilling medium in one or two mutually perpendicular directions in spaced vertical planes for chilling glass sheets supported in a vertical plane, it is understood that the principles of the present invention are also applicable to applying one or two reciprocating movements in any plane parallel to any plane in which a glass sheet may be supported for tempering.

BRIEF DESCRIPTION OF THE DRAWINGS

In the drawings which form part of a description of an illustrative preferred embodiment of the present invention and where like reference numbers refer to like structural elements.

DESCRIPTION OF A PREFERRED EMBODIMENT

Figure 3:
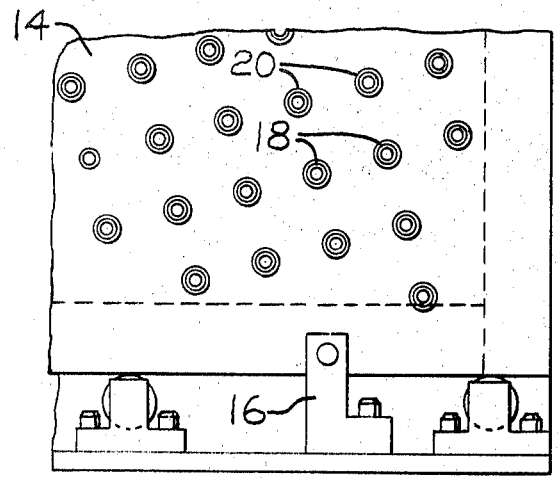
FIG. 3 is a fragmentary elevational view showing the nozzle array for one of the plenum chambers.
Figure 1:
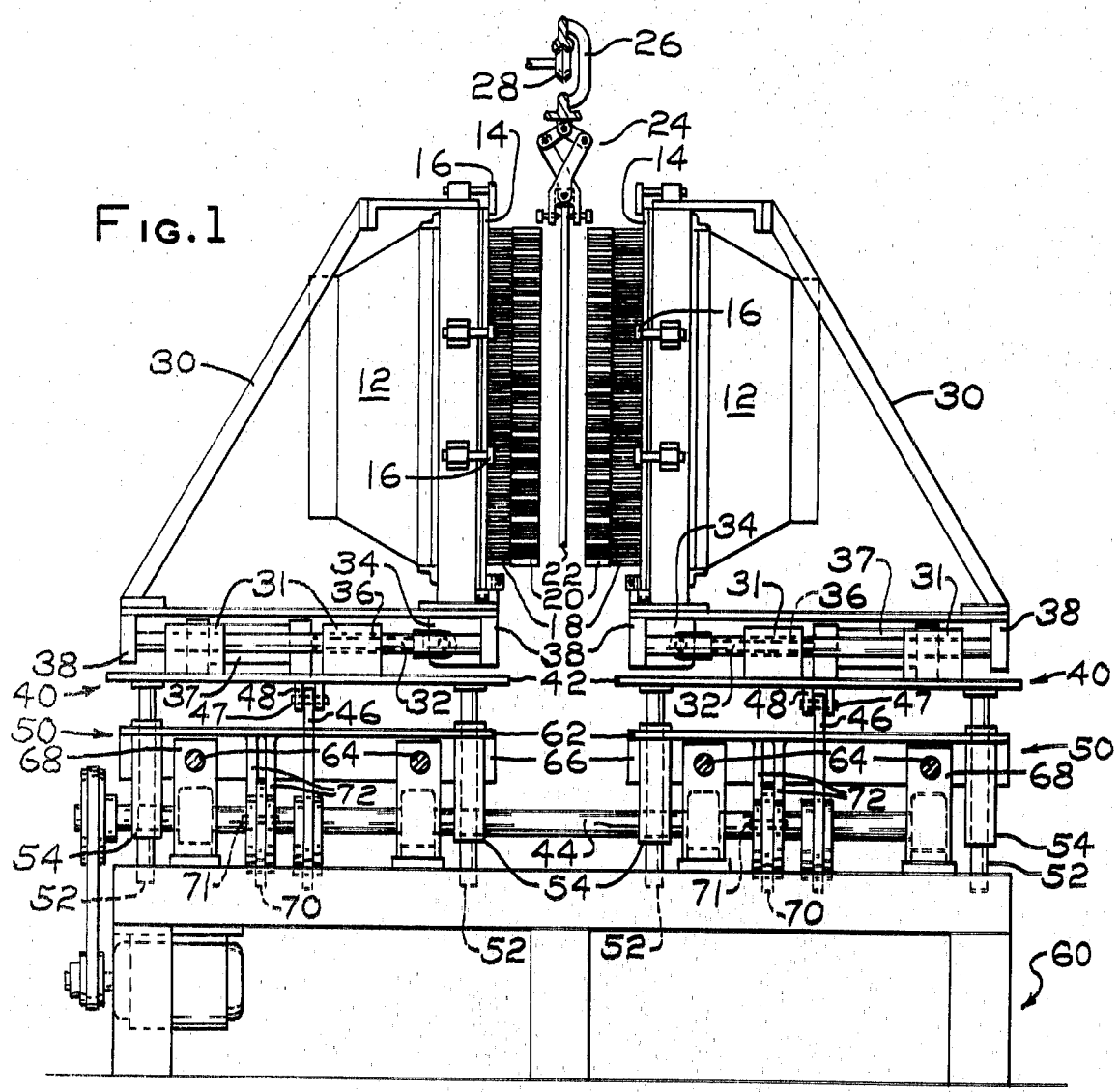
FIG. 1 is an end view partly in section, of an illustrative embodiment of the present invention; with certain parts broken away to show other parts more clearly.
Figure 2:
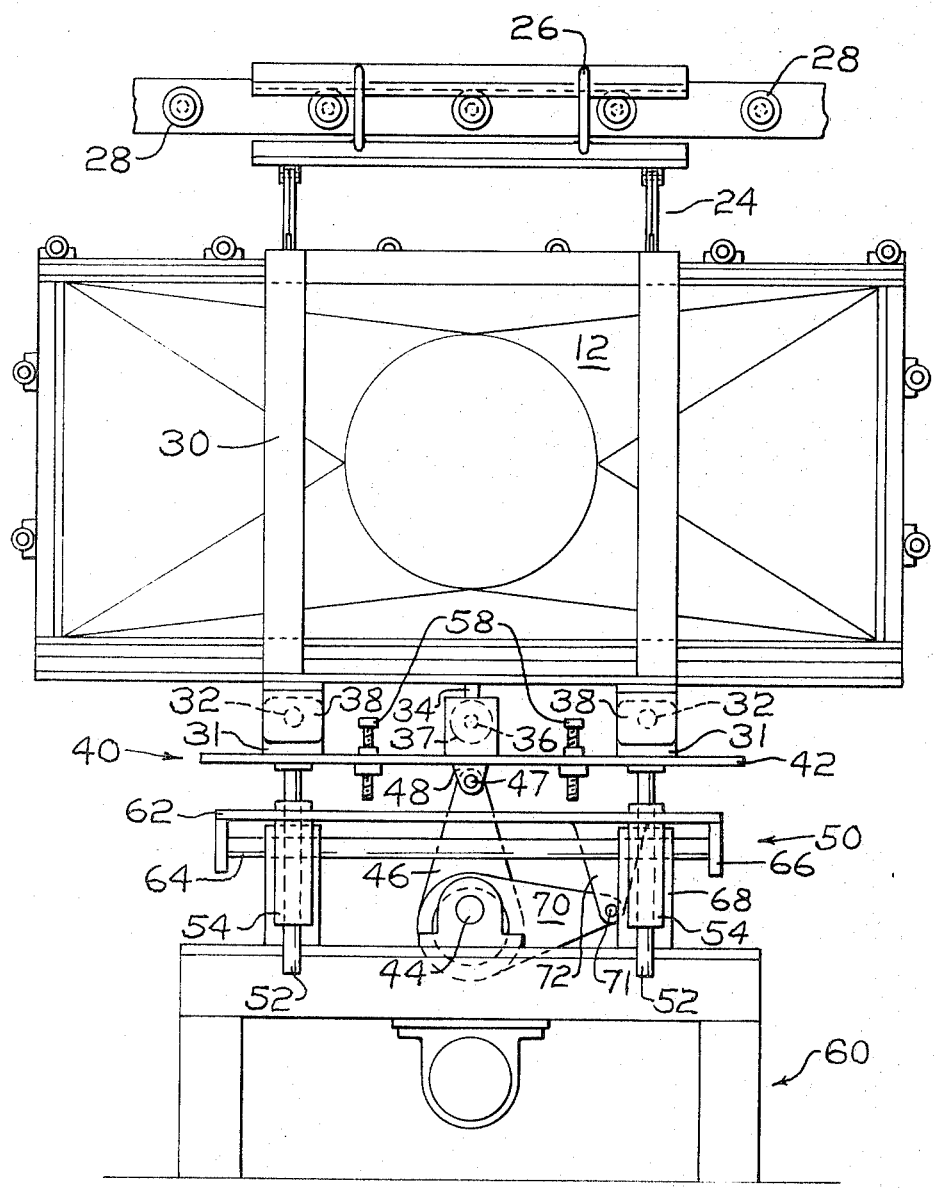
FIG. 2 is a view taken at right angles to the view of FIG. 1 and partly in section to illustrate certain important elements of the present invention.

Referring to the drawings, a tempering apparatus comprises a pair of plenum chambers 12 connected through flexible conduits (not shown) to a conventional blowing means (not shown). An apertured wall 14 is locked to the opposing inner ends of each plenum chamber through peripherally spaced clamping means 16. Each aperture in the apertured wall supports an elongated nozzle 18.

Flexible nozzle extensions 20 are provided where needed to form a pair of spaced discontinuous shaped surfaces conforming to the shape of glass sheets undergoing treatment. To accomplish this, nozzle extensions 20 of different lengths are attached over the free ends of different nozzles 18 to provide spaced arrays of the ends of the flexible nozzle extensions 20 that conforms to any shape desired. The nozzles 18 are preferably of tubular metal and the nozzle extensions 20 of synthetic silicone rubber or spring metal or the like. The free inner ends of the nozzle extensions 20 terminate at equal distances from the positions occupied by the portions of a glass sheet that they face.

A glass sheet 22 is shown suspended by one or more pairs of tongs 24 of the self-closing type. A carriage 26 that rides on a series of rotatable rolls 28 of a roller conveyor is used to support the tongs 24. Any conventional type of tong may be used to grip the glass sheets 22 near their upper edge. However, it is preferred to use tongs of the type shown in U.S. Pat. No. 2,991,114 to Lee R. Robinson which are provided with stops that engage the upper edge of the glass so that the glass gripping elements of the tongs engage the major surfaces of the glass at a definite, predetermined distance from the upper edge that is neither too close to the upper edge nor too far from the upper edge.

Each plenum chamber 12 is reinforced by a skeleton structure 30 whose lower portion comprises a pair of horizontally extending slide rods 32 slidably mounted through spaced apertured lugs 31. An additional lug 34 is attached to a horizontal piston shaft 36 capable of horizontal movement in both directions. Each end of each slide rod 32 is fixed to a bracket 38 rigidly attached to the skeleton structure 30. A double acting piston 37 actuates movement of the piston shaft 36 and with it the skeleton structure 30 in a horizontal path guided by the slide rods 32. The lugs 31 and pistons 37 are carried by an upper supporting means 40 so that the slide rods 32 are slidably supported in bearing contact with the spaced lugs 31 when the plenum chambers 12 are moved with piston shafts 36.

The upper supporting means 40 comprises a pair of upper tables 42 mounted in parallel relation to one another, one for supporting one of the plenum chambers 12 and its reinforcing skeleton structure 30 and the other for supporting the other plenum chamber 12 and its respective skeleton supporting structure 30. Each upper table 42 is provided with a plurality of the aforesaid lugs 31 so that when the piston shaft 36 is moved, the position of the respective plenum chamber 12 relative to the upper table 42 is changed in a horizontal direction normal to the path of glass sheet movement defined by the roller conveyor. Thus, the plenum chambers 12 may be separated from one another whenever it is desired to change one array of nozzle extensions 20 for another whenever there is a change in patterns to be produced. In addition, when the plenum chambers 12 are separated, the position of the array of nozzle extension openings on each side of the position the glass sheet 22 occupies in the tempering station may be regulated to insure that the nozzle to glass distance is optimum for the thickness and shape of glass undergoing tempering. The piston rods 36 may be actuated by a series of limit switches engagable by cams carried by the carriage 26 to separate the plenum chambers 12 to permit curved glass sheets to move into a position between the plenum chambers 12 for quenching, to move the plenum chambers to a closed position during quenching and to separate them again after quenching is completed to permit removal of the shaped glass sheet.

As stated previously, it is necessary to impart relative motion between the arrays of nozzles and the glass sheet in order to avoid establishing an iridescence pattern in the glass resulting from non-uniformly chilling the glass. The present invention provides vertical reciprocation for the upper tables 42 and their supported plenum chambers 12 through a main drive shaft 44 provided with eccentric driving links 46. The upper end of each eccentric driving link 46 is connected through a pin 47 to an eccentric clevis 48 fixed to a different table 42. A lower support means 50 guides a plurality of vertical posts 52 depending from each upper table 42 by vertical sleeves 54 attached to means 50. The posts 52 and sleeves 54 thus guide the vertical movement of the tables 42 in vertical reciprocating paths when the upper tables 42 are drivingly connected to the main drive shaft through eccentric driving link 46. Each upper table is provided with a pair of locking bolts 58, the purpose of which will be explained later.

The main drive shaft 44 is also drivingly connected to the lower supporting means 50. The latter comprises a pair of lower tables 62. Each lower table 62 is disposed below an upper table 42 and is provided with spaced elongated horizontal rods 64 that are connected at their longitudinal ends to end walls 66 and intermediate their end walls to apertured supports 68 carried by a main support structure 60. The elongated rods 64 extend horizontally at right angles to the direction of the main drive shaft 44. An eccentric driving link 70 drivingly connects the main drive shaft 44 through a pin 71 to an eccentric clevis arrangement 72 similar to the pins 47 and the eccentric clevises 48 that connect the eccentric driving links 46 to the upper tables 42.

The lower tables 62 are smaller than the upper tables 42 and the locking bolts 58 may be adjusted downward until the lower ends of the bolts 58 are in contact with the upper surface of tables 62 to enable the locking bolts 58 to apply the weight of the upper tables 42 on the lower tables 62 whenever it is desired to remove the locking pins 47 from the eccentric clevises 48. With the upper table driving clevis 48 disconnected from the eccentric driving link 46 and with the vertical guide rods 52 extended in the vertical sleeves 54 carried by the lower tables 62, the upper tables 42 and the lower tables 62 are reciprocated in unison whenever main drive shaft 44 is rotated. The reciprocation is horizontal.

When the driving pins 71 between the eccentric driving links 70 and the lower table clevises 72 are disconnected and the driving pins connecting the eccentric drive links 46 and the eccentric clevises 48 of the upper tables 42 are connected, the lower tables 62 remain fixed in place relative to the main support structure 60 and the upper tables 42 reciprocate vertically when the main drive shaft 44 is rotated through the eccentric drive link 46, the eccentric clevis 48 and the vertical guide means provided by the sliding engagement of the vertical guide rods 52 through the vertical sleeves 54. When both eccentric driving links 46 and 70 are suitably connected to their respective drive clevises 48 and 72, through pins 47 and 71, a closed circular orbital pattern is provided to each plenum chamber 12 supported on its respective upper supporting means 40 which moves relative to the lower tables 62 in a vertical direction while keyed for horizontal reciprocation with the lower supporting tables 62 in a horizontal direction along the axis defined by the elongated rods 64.

As shown in FIG. 3, the nozzles 18 are arranged in rows extending obliquely to the axes of horizontal or vertical reciprocation. This arrangement enables the nozzles to sweep areas of the glass sheet that overlap the areas swept by blasts from adjacent nozzles regardless of whether the arrays of nozzles are reciprocated linearly in the horizontal direction or in the vertical direction, or whether a closed orbital motion is imparted to the nozzles in vertical planes generally parallel to the vertical plane of support for the glass sheet. It is well known that the displacement of each nozzle must be greater than the distance between adjacent nozzles in order to provide as uniform a cooling pattern as possible.

A typical program of operation for the above-identified apparatus is as follows: As a glass sheet reaches the temperature needed for tempering, it is transferred from the furnace (not shown) to a position between the plenum chambers 12. The latter occupy a retracted position to which they moved by outward movement of the piston shafts 36 when the previous glass sheet to be treated left the tempering station. During the movement of the next glass sheet 22 from the furnace to the quenching station, the carriage 26 trips a limit switch along the carriage conveyor 28, which actuates a timer that actuates inward displacement of the piston shafts 36 toward one another, which displaces the plenum chambers 12 toward a closed predetermined position. The blowers are actuated to start delivering air blasts against the opposite surfaces of the glass sheet when one of the skeleton supporting structures 30 engages a limit switch whose position for engagement is adjustable depending upon the nature of the shape of the glass sheet being treated. The main drive shaft 44 operates continuously throughout the operation to avoid any inertia problems brought about by the fact that the upper supporting means 40, the lower supporting means 50 and the plenum chambers 12 and the skeleton supporting structure 30 have too great a mass to start and stop movements intermittently. Therefore, as soon as the plenum chambers arrive at the closed position, air is blasted in moving patterns relative to the glass sheet 22 supported therebetween for sufficient time to impart the desired temper in the glass.

A timer actuated by the limit switch that initiates the air blasts times out to shut off the blower that supplies pressurized air to the plenum chambers, causes piston rods 36 to retract and the conveyor 28 to transfer the carriage 26 to a subsequent treating station which may be an unloading station. The cooling or quenching station is now in condition to receive the next glass sheet to be processed.

The only time the drive shaft 44 is stopped is when the apparatus is not used or the apparatus is being prepared for a change of pattern. Then, as a consequence of the pattern change, it may become necessary to attach or remove the pins 47 which engage eccentric driving links 46 to clevises 48 to provide a vertical component of motion of the upper tables 42 and the plenum chambers 12 relative to the lower tables 62 and/or to attach or remove the pins 71 which engage eccentric driving links 70 to clevises 72 to impart a horizontal component of motion to the lower tables 62, the upper tables 42 and the plenum chambers 12. If both sets of eccentric driving links 46 and 70 are engaged, the two components of motion combine to provide closed orbital movement to the plenum chambers 12. Otherwise, with only one set of driving links engaged, the plenum chambers 12 are provided with linear reciprocating movement as described before.

The description of the preferred illustrative embodiment has been for the purpose of illustration rather than limitation. It is understood that various changes may be made such as altering the plane of support and the substantially parallel planes for reciprocating the opposing nozzle arrays relative to the supported glass along either a selected axis of reciprocation or a combination of axes of reciprocation angularly disposed relative to one another in any plane approximately parallel to the plane of glass support without departing from the gist of the invention as defined in the claimed subject matter that follows.

I claim:

1. Apparatus for cooling glass sheets comprising a pair of plenum chambers, each having an inward facing, apertured wall facing an inward facing, apertured wall of said other plenum chamber in spaced relation thereto, means for supporting a glass sheet between said apertured walls in a given plane, means for imparting tempering medium under pressure to said plenum chambers for delivery through said apertured walls against the opposite surfaces of a heated glass sheet located therebetween, first means for supporting said plenum chambers for reciprocation in unison in planes substantially parallel to said given plane in a horizontal direction, second means for supporting said plenum chambers for reciprocation in unison in said substantially parallel planes in a vertical direction, drive means, means to selectively couple said drive means to said first support means to reciprocate said plenum chambers in unison in said horizontal direction, means to selectively couple said drive means to said second support means to reciprocate said plenum chambers in unison in said vertical direction, and means for operatively interconnecting said first and second support means to move said plenum chambers in unison in closed orbital paths when said drive means is selectively coupled by each of said coupling means to its respective said support means.

2. Apparatus for cooling glass sheets comprising a pair of plenum chambers, each having an apertured, generally vertical wall facing a corresponding apertured, generally vertical wall of said other plenum chamber, a nozzle extending horizontally from each aperture and terminating in a free end spaced from a free end of a corresponding nozzle extending from said other wall, means for supporting a glass sheet in a vertical position between said free ends of said nozzles, upper supporting means connected to said plenum chambers, lower supporting means for supporting said upper supporting means, a main drive shaft, means to selectively couple said upper supporting means to said drive shaft in a manner to impart a vertical reciprocation to said upper supporting means and said plenum chambers when only said upper supporting means is coupled to said drive shaft, means to selectively couple said lower supporting means to said drive shaft in a manner to impart a horizontal reciprocation to said lower supporting means and said plenum chambers when only said lower supporting means is coupled to said drive shaft, and means coupling said upper supporting means to said lower supporting means to permit said upper supporting means to reciprocate vertically relative to said lower supporting means when said upper supporting means is coupled to said drive shaft and to move said upper supporting means with said lower supporting means when said lower supporting means is coupled to said drive shaft so that said plenum chambers move in closed orbital paths in planes substantially parallel to said vertical position when both said supporting means are coupled to said drive shaft.

3. Apparatus as in claim 2, wherein said upper supporting means comprises a pair of tables horizontally aligned in spaced relation to one another, means mounted on each of said tables to support a plenum chamber for horizontal movement relative to said tables, and means to actuate the horizontal movement of each of said plenum chambers relative to its supporting table between a closed position and a retracted position.

* * * * *